(12) United States Patent
Nolte et al.

(10) Patent No.: US 7,430,723 B2
(45) Date of Patent: Sep. 30, 2008

(54) SYSTEM AND METHOD FOR IMPLEMENTING A THREE-DIMENSIONAL GRAPHIC USER INTERFACE

(75) Inventors: Holger Nolte, Munich (DE); Camilla Horst, Munich (DE); Marc Hoffman, Neubiberg (DE); Werner Posch, Oberhaching (DE)

(73) Assignee: GSE Advanced Industrial Technologies, GmbH (DE)

( * ) Notice: Subject to any disclaimer, the term of this patent is extended or adjusted under 35 U.S.C. 154(b) by 993 days.

(21) Appl. No.: 10/001,940

(22) Filed: Nov. 29, 2001

(65) Prior Publication Data

US 2003/0098881 A1    May 29, 2003

(51) Int. Cl.
G06F 3/00      (2006.01)
G06F 9/00      (2006.01)
G06F 17/00     (2006.01)

(52) U.S. Cl. ..................................... 715/764

(58) Field of Classification Search ............... 345/848, 345/764, 767, 856, 859, 860, 849, 852, 421, 345/427, 422, 419, 642, 545, 546, 549, 550; 715/848, 764, 767, 856, 859, 860, 849, 852
See application file for complete search history.

(56) References Cited

U.S. PATENT DOCUMENTS

| | | | | |
|---|---|---|---|---|
| 5,129,054 A | * | 7/1992 | Alstad et al. ............ | 345/419 X |
| 5,696,533 A | * | 12/1997 | Montgomery et al. ... | 345/860 X |
| 5,825,363 A | * | 10/1998 | Anderson .................... | 345/422 |
| 5,945,976 A | * | 8/1999 | Iwamura et al. ............. | 345/419 |
| 6,037,936 A | * | 3/2000 | Ellenby et al. .............. | 345/764 |
| 6,384,841 B1 | * | 5/2002 | Lebovitz et al. ............. | 345/642 |
| 6,396,522 B1 | * | 5/2002 | Vu ............................. | 345/848 |

* cited by examiner

Primary Examiner—Kristine Kincaid
Assistant Examiner—Boris Pesin
(74) Attorney, Agent, or Firm—Baker & Hostetler LLP

(57) ABSTRACT

A graphical user interface for displaying and interacting with a rendered image of a graphical object on a display device. A color value is stored for each pixel in the display device. Object identification data is stored with each pixel covered by the rendered image wherein the object identification data uniquely identifies a particular one of the graphical objects located at the least one pixel.

11 Claims, 5 Drawing Sheets

SYSTEM AND METHOD FOR IMPLEMENTING A THREE-DIMENSIONAL GRAPHIC USER INTERFACE

BACKGROUND OF THE INVENTION

1. Field of the Invention

The present invention relates, in general, to graphical user interfaces, and, more particularly, to software, systems and methods for display and selection of objects in three-dimensional graphical displays.

2. Relevant Background

Although computers and data communication networks have revolutionized the processes of exchanging information, they are primarily used to exchange one-dimensional or two-dimensional data. In other words, existing systems are efficient at communicating raw data such as text and numbers (i.e., one-dimensional data) and some formatted data such as graphs and text on a formatted page (i.e., two-dimensional data). However, three-dimensional data used in computer aided design (CAD) and computer aided manufacturing (CAM) tools tend to be handled by more advanced machines.

It is important to distinguish between three-dimensional display devices and three-dimensional graphical user interfaces. Many techniques for rendering images that appear to be three-dimensional are known. These systems use perspective drawing techniques to display three-dimensional images, but interact with users in a conventional two-dimensional fashion. A graphical user interface, in contrast, requires that a user be able to select and interact with three-dimensional graphical objects, not just view them.

Although a markup language called virtual reality markup language (VRML) is being developed for three-dimensional rendering, these efforts are directed to rendering three-dimensional graphics and not to systems and methods that enable interaction with three-dimensional graphical objects. Alternatively, active content such as Java and ActiveX are used to create three-dimensional objects with programmatically defined behavior. However, such systems rely on complex mathematical computations to distinguish objects within a particular window and so have not been widely accepted to implement three-dimensional graphical user interfaces.

Three-dimensional graphical displays are implemented on two-dimensional display devices where the image is rendered and drawn in a manner that visually conveys the three-dimensional relationships between objects. Using an x-y reference to indicate the horizontal and vertical axes of the display and a z axis to indicate distance from the viewer, at any given x-y location, any number of objects may exist in different z planes. Only one of the objects, however, is closest to the viewer.

Most graphical user interface (GUI) software for selecting displayed objects allows a user to identify a particular x-y location (or range of locations) using a mouse, keyboard, joystick, pen/tablet, or other user input device that allow a user to manipulate the position of a cursor on a display. In some instances the x-y location information is communicated from the GUI processes to other processes that provide information about the object(s) in the vicinity of a cursor. For example, information about a displayed object or a related help dialog may be displayed while a cursor hovers or floats above a particular x-y location. A user may select the object at that x-y location by activating a control on the user interface device. With two-dimensional data only a single object will exist at any selected x-y location.

However, a significant challenge for 3-D graphical user interfaces involves selection of the object closest to the viewer's perspective from amongst the layered objects that exist at a particular x-y location. The system must first determine which of the several objects at a particular x-y location is the "nearest" to the user. GUI processes found in most operating systems communicate only x-y location information to external processes. In most cases, the GUI processes may communicate color information as well. Hence, the information provided by the GUI processes is ambiguous with respect to which object is the closest to the user in a 3-D display.

In three-dimensional graphical software, processes and data structures exist that maintain information about the object's placement in x, y and z dimensions. A "z-buffer" refers to a software or hardware data structure that holds depth information for each given x-y location to manage which screen elements can be viewed and which are hidden behind other objects. A typical configuration of a z-buffer comprises a number of bits of memory associated with each display pixel where the bit value indicates the distance in the z-axis of the displayed pixel. A rendering algorithm can then draw only pixels with a z-buffer value indicating a closer position to the viewer (e.g., the pixels with the largest or smallest z-buffer value) at each x-y location. The z-buffer may be maintained by application software, or by specialized graphic subsystem such as a graphics accelerator card in a personal computer. These subsystems tend to be memory intensive to provide multiple bits of resolution in the z-axis for each pixel of the display.

When an application creates a 3D graphical object, a set of points is used to represent a shape. The points are then connected by lines to form a mesh or wireframe. The wireframe defines a set of polygons that represent surfaces of the graphical object. Once the polygons have been created, the application software can then shade the individual polygons to create the appearance of a solid object, or apply texture to the object. The greater the number of points used to define the shape, the greater the resolution that the object can be displayed.

In a complex scene comprising multiple objects, the application must create and track many objects and surfaces that may not be visible in a particular scene. Each time the display is drawn, application software selects the graphical objects having surfaces that will be visible on the screen at each pixel of the display. For each point in the scene, a surface depth ordering is performed by computing a z-distance for each object from a particular vantage point or "camera" view. The z-distance is typically expressed in some units of measure defined by the application itself such as "meters" or "feet" or an arbitrary scale used by the application. Intersections of multiple objects at each x-y location are detected, and one object to be displayed is selected for each pixel based on the z-distance (ignoring, for the moment, transparent objects).

Some of the rendering tasks may be handed off to a graphics subsystem, in which case the z-distance may be converted into a z-buffer value expressed in arbitrary units understood by the graphics subsystem. Information is communicated from the graphic subsystem to a two-dimensional display buffer in the form of x-y coordinates and color data for that coordinate. Significantly, the display buffer, also called a "frame buffer" has no knowledge of the objects it is displaying or whether they are one-, two-, or three-dimensional.

To select a displayed object using a GUI a given x-y location is selected, which is used by the graphics subsystem to determine a "pick ray" extending from a virtual eye point used for rendering and the point at the x-y location selected. This ray is geometrically intersected with all polygons of all objects, which may be up to many hundreds of thousands of polygons. The polygon with the nearest intersection to the viewer belongs to the selected object. This process is computationally expensive process.

Moreover, in client-server systems where the some or all of the processing must occur on a server that is physically distant from the display device, object selection processes are slow. Some improvements have been realized in the display of 3D graphical objects, but improvements that allow selection and user interaction with 3D graphical user interfaces has lagged. In essence, these systems portray a user interface that appears three-dimensional, but in practice is two-dimensional when in terms of object selection. Moreover, many proposed systems require specialized browser software or plug-ins to operate. As a result, implementation of lightweight computing devices to serve as three-dimensional graphical user interfaces has been impractical.

SUMMARY OF THE INVENTION

Briefly stated, the present invention involves a graphical user interface for displaying and interacting with a rendered image of at least one graphical object. The graphical object is displayed using a number of pixels on a display device. A color value is stored for each pixel in the display device. Object identification data is stored with each pixel covered by the rendered image wherein the object identification data uniquely identifies the graphical object located at the at least one pixel.

In another aspect, the present invention involves a computer-readable medium containing instructions for controlling a data processing system to perform a method of providing information to a program object. The method includes rendering an image of a plurality of graphical objects at specified locations of a two-dimensional display device, wherein at least two of the graphical objects intersect at least one location on the two-dimensional display device. A color value is stored for each location in the two-dimensional display device. Object identification data is stored for each of the specified locations, wherein the object identification data uniquely identifies one of the intersecting graphical objects at the at least one location. Only one of the intersecting graphical objects is visually displayed at the at least one location, and the object identification data is used to identify only the visually displayed one of the intersecting graphical objects.

In yet another aspect, the present invention involves a computerized system having a display comprising a plurality of pixels where each pixel is located at a defined coordinate. An application process generates a plurality of graphical objects, each graphical object having a unique object identification (ID) value. A rendering process receives the plurality of graphical objects and determines visible surfaces of the plurality of graphical objects with respect to a predetermined perspective. A pixel map is provided comprising a plurality of entries, each entry corresponding to one of the visible surfaces determined by the rendering process. Object identification data is associated with at least some of the entries in the pixel map. The system includes pointer movable to selected coordinates of the display, movement of which is controlled by a pointing device and an object identification process coupled to read the coordinates of a selected pixel pointed to by the pointer and extract the object identification information associated with the pixel.

DETAILED DESCRIPTION OF THE PREFERRED EMBODIMENTS

The present invention solves limitations of the prior art by embedding object ID information in the color information for each displayed pixel. Each displayed pixel is normally associated with a color value stored as a number of bits of color information. In Microsoft Windows operating system, for example, the color value is represented by up to a 32-bit value for each pixel. This color depth is much greater than can actually be portrayed by the display device, or perceived by a typical user.

In one aspect, the present invention associates an object ID value with each pixel, where the object ID value provides a unique identification of the object having a surface displayed at that pixel. The object ID may be of any length necessary, but should be large enough to uniquely identify each object in the scene. In a particular embodiment, the invention robs some of the color bits (e.g., 7 bits) to store an object ID value. In alternative embodiments, object ID bits may be appended to the color bits in the frame buffer.

The object ID value indicates the object closest or frontmost with respect to the "viewing perspective". This object will be selected if the corresponding x-y location is selected by a user. The object ID can be determined readily during the rendering process and then written to the frame buffer. When a user selection is made, the object ID for the selected x-y location(s) is/are extracted from the frame buffer without need for complex computation. This works as well when a cursor is "floated" over an x-y location such that the object ID of the object under the cursor can be extracted and information displayed and passed on to other processes.

In this manner, an efficient, interactive three-dimensional graphical user interface system is provided. Simple object identification and selection can be performed with little memory overhead greatly reducing the hardware requirements for the display device. Moreover, complex algorithms are not needed for these basic user interface processes further reducing the resource requirements on the display device. The display data can be computed and rendered on a server and sent to a lightweight display computer such as a handheld computer or web tablet.

Figure 1:
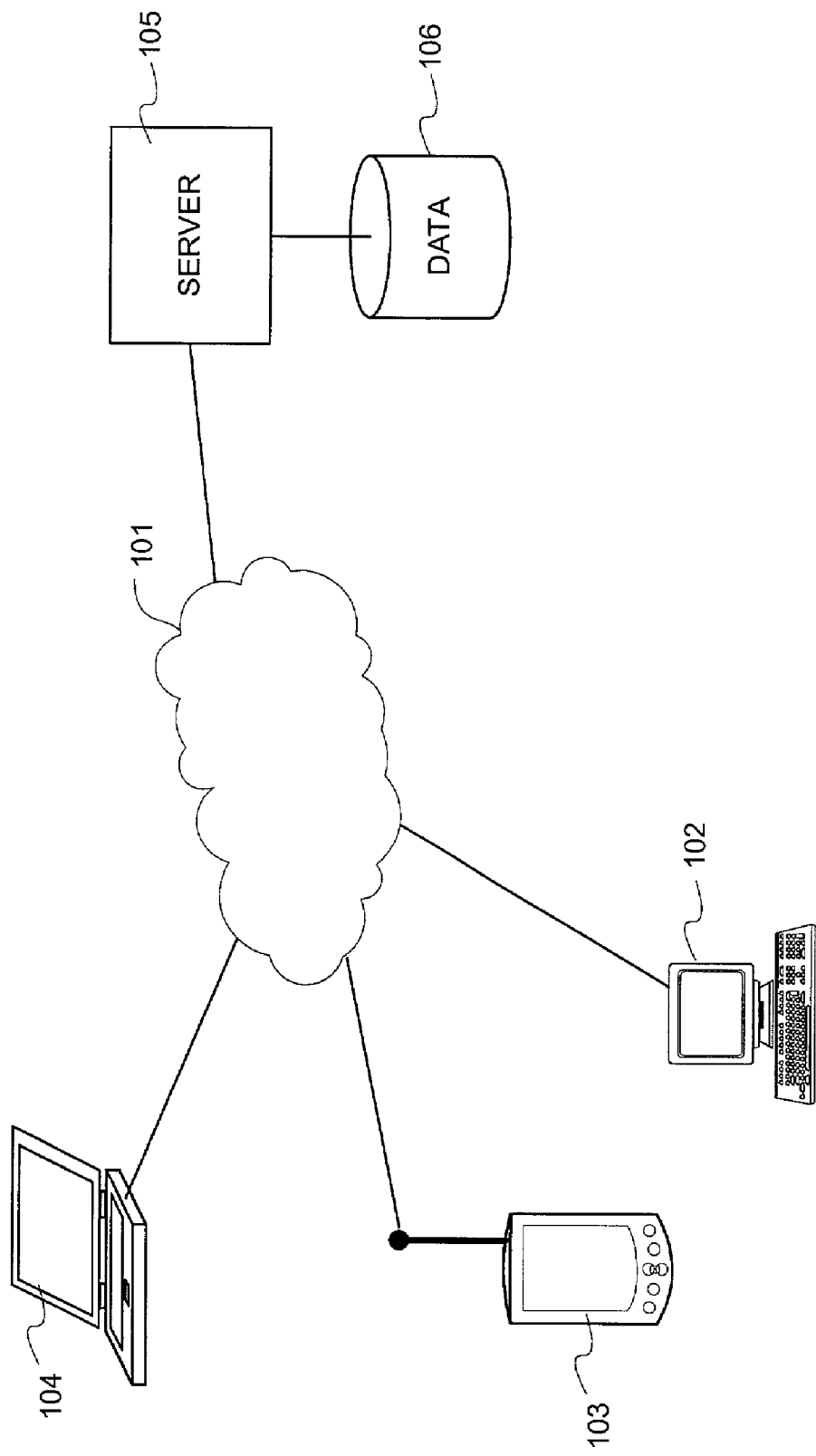
FIG. 1 shows a networked computer environment in which the present invention is implemented.

FIG. 1 shows a networked computer environment in which the present invention is implemented including various computing devices such as personal computer 102, wireless handheld device 103, and laptop 104 interconnected by a network 101. It should be understood that the present invention does not require a network environment. In fact, because the present invention can greatly ease the hardware requirements needed to provide a three-dimensional graphical user interface, it enables stand-alone operation of devices such as handheld device 103 with relatively little computing power. However, for this same reason the present invention enables client-server computing systems in which computationally intensive graphical processes and/or database operations are conducted on a server 105. In such systems, end-user devices 101-104 may implement only a graphical user interface, or may implement any desired subset of the graphical processes used to render and manipulate graphical user interface objects.

Each of the devices shown in FIG. 1 may include memory, mass storage, and a degree of data processing capability sufficient to manage the display of information using a two-dimensional display device. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as data store 106 that provides mass storage capacity beyond what an individual device can efficiently use and manage. Selected components of the present invention may be stored in or implemented in data store 106.

Figure 2:
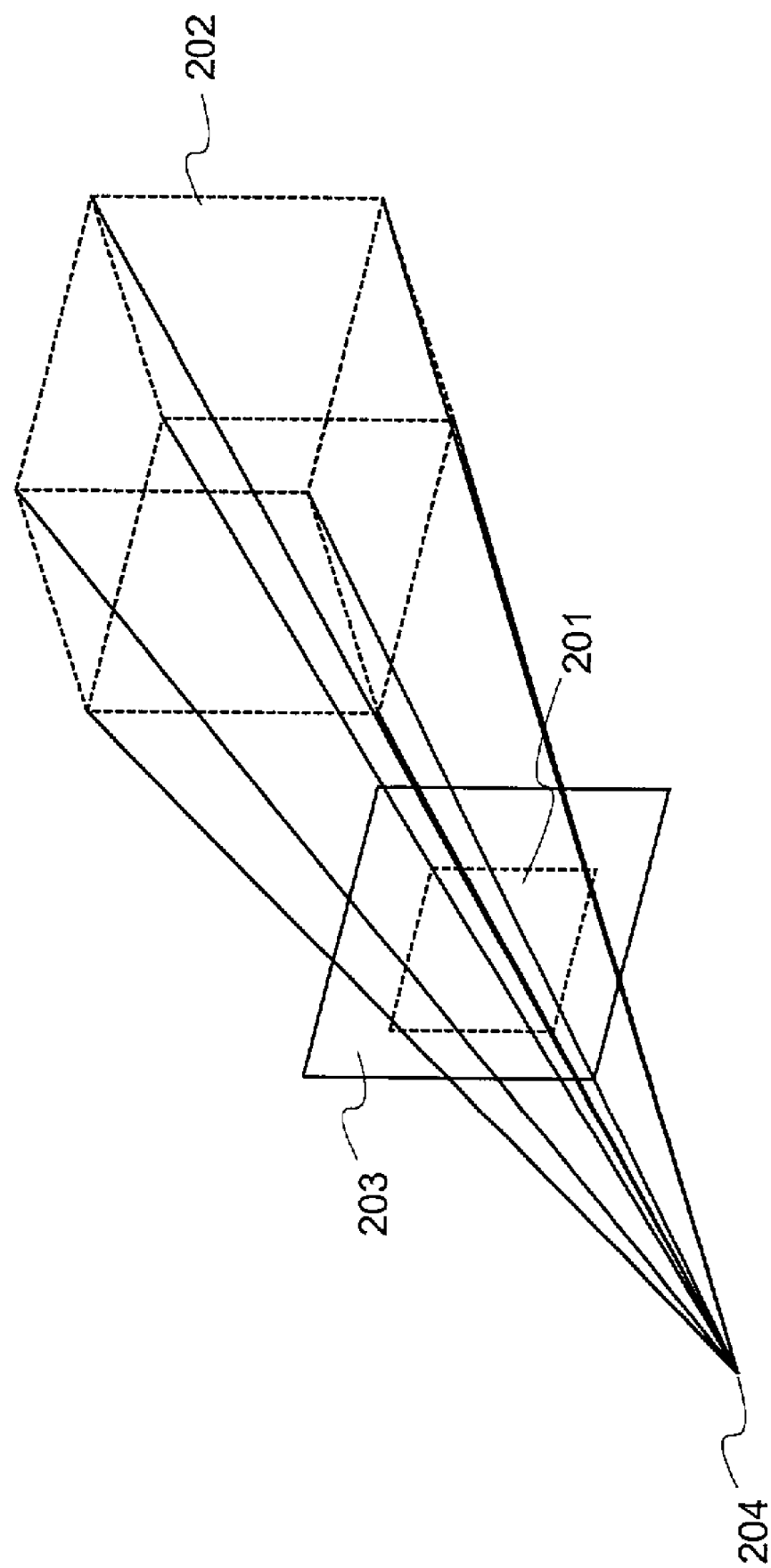
FIG. 2 diagramatically illustrates processes involved in a graphical user interface system in accordance with the present invention.

FIG. 2 diagramatically illustrates processes involved in a graphical user interface system in accordance with the present invention. A three-dimensional user interface is realized on a two-dimensional screen indicated by dashed line 201 that is substantially in line with a view plane 203. Screen 201 may be implemented using cathode ray tube (CRT), liquid crystal display (LCD), plasma display, or other available display technology. Similarly, screen 201 may be a "virtual screen" rather than a physical screen in that the view screen can be implemented as an image file and transmitted between computing device. As currently implemented, most computer screens 201 comprise a plurality of locations (e.g., "pixels") arranged in a two-dimensional array. Each pixel is on or off in a pure monochrome system, or activated with a red-green-blue (RGB), or cyan-magenta-yellow (CMY) or the like to represent color on a pixel-by pixel basis.

The dashed-line object 202 represents a three-dimensional object or scene to be rendered on screen 201. Object 202 comprises a software-defined graphical object or data object that is generated by a software application. Object 202 is described, for example, by its coordinate location including a distance in the z-axis from the viewpoint 204.

The rendering and display processes involve a variety of algorithmic processes that essentially compute rays between a viewpoint 204 and points, lines, surfaces and features of object 202. The intersection of these rays with view plane 203 results in a set of points on screen 202. Object 202 is displayed by activating pixels at or near each of the set of points. In most systems a more complex set of processes occurs in actually rendering objects, but for purposes of the present invention the simplified representation of FIG. 2 is useful.

As is apparent in FIG. 2, not all surfaces of any three-dimensional object 202 will be visible on screen 201. This is particularly true when multiple objects 202 are placed in a scene so that visibility of some objects is blocked by other objects. Also, the objects and surfaces that are visible are dependent upon the view point and perspective that is selected, as well as constraints of the size of display 202.

Figure 3:
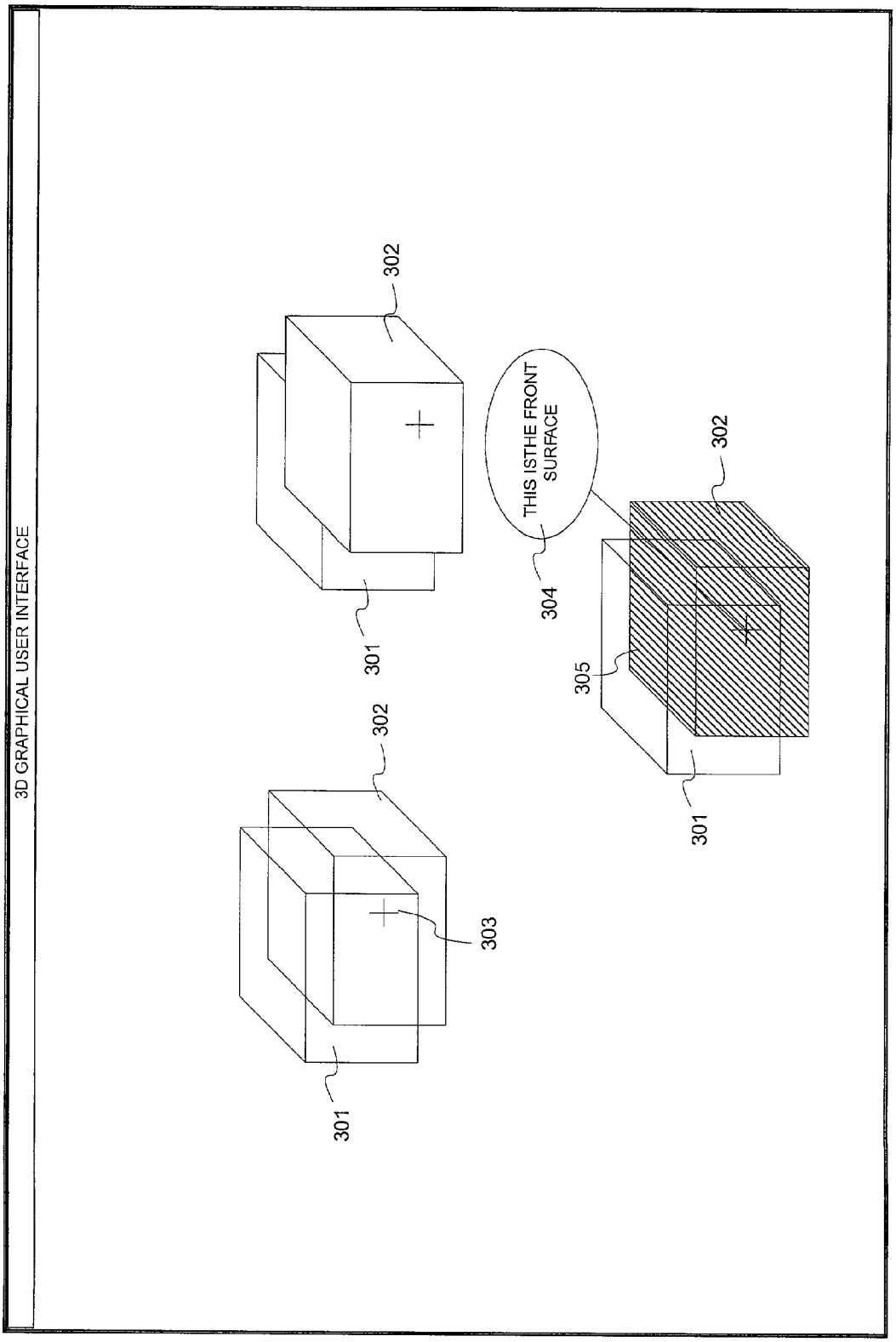
FIG. 3 shows a three-dimensional graphical user interface in accordance with the present invention.

FIG. 3 illustrates a three-dimensional graphical user interface in accordance with the present invention in a simplified example displaying multiple graphical shapes. It is contemplated that the present invention be largely compatible with existing two-dimensional graphical user interface processes such as found in Windows, Windows CE, X-windows, and the PALM OS operating systems as suggested in FIG. 3. These operating systems allow a cursor or pointer 303 to move across user-selected locations in a two-dimensional screen under control of a pointing device. These operating systems support GUI processes that provide x-y location pointed at by the cursor, and can provide color information including red, green, blue pixel values for a pointed to pixel.

In the upper left-hand depiction in FIG. 3, a rear object 301 is partially obscured by an overlying front object 302. As can be seen in the wireframe depiction in the upper left hand illustration, it is difficult to visually discern the separate objects. It is also difficult for a computer to tell whether cursor 303 is pointing to object 301 or object 302. In the upper left-hand depiction, the visual display can be improved by shading surfaces to hide surfaces that are not visible. In such a depiction, only the front-most object is visible at any pixel location. While this solves the visual depiction problems for a user, it does not simplify the ability of the computer to distinguish between the objects 301 and 302. That is because from the software application's perspective, both objects 301 and 302 must be retained in their entirety so that the image can be manipulated (e.g., rotated, selected and moved). Hence, given an x-y position data and color information associated with a location pointed at by a cursor, prior systems required complex processing to distinguish between object 301 and object 302.

In contrast, the present invention includes unique object identification values with the display information for each object. In the lower depiction in FIG. 3, shaded areas represent a first object ID value and unshaded areas indicate a second object ID value. In a particular example, the object ID value is stored with color information in the frame buffer of a display device. Hence, when the x-y position data and color data are written to or read from the frame buffer, the object ID value can be manipulated and used. A receiving process can, for example, perform a simple table look up to retrieve metadata associated with an object. As shown in FIG. 3, the metadata might be used to display a floating dialog box giving more information about the object that cursor 303 currently points to, or may be used to select or change the display of an object 301 or 302. Aside from the computationally efficient table lookup, no other processes need be initiated or employed to identify an object from the information provided by the conventional two-dimensional GUI processes.

Figure 4:
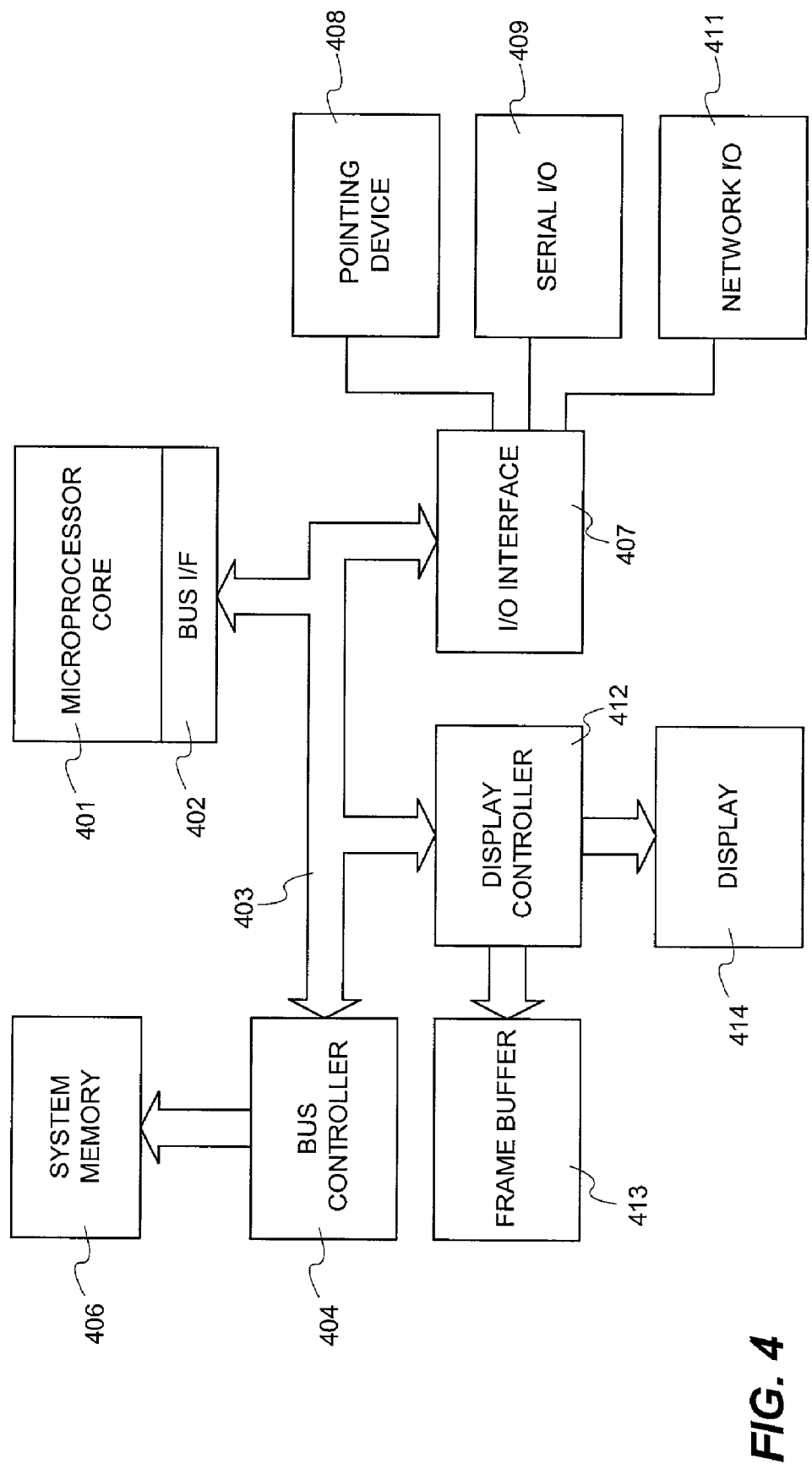
FIG. 4 shows an exemplary computer system useful in implementing a three-dimensional graphical user interface in accordance with the present invention.

FIG. 4 shows an exemplary computer system useful in implementing a three-dimensional graphical user interface in accordance with the present invention. It should be understood that the computer system shown in FIG. 4 is highly generalized and that a significant variety in architectures and implementations exist in commercially available computer systems. FIG. 4 is intended to illustrate hardware resources useful in an exemplary implementation, and not as a limitation of the present invention unless specifically indicated otherwise. The components shown in FIG. 1 may be integrated into a single housing, or in some cases into a single integrated circuit, or may be formed on a printed circuit board using multiple integrated circuits and discrete components, or formed as separate devices coupled by cabling and busses.

A microprocessor core 401 includes instruction execution resources such as one or more arithmetic logic units (ALUs), registers, and processes for fetching, scheduling, issuing and completing instruction execution. microprocessor core 401 is coupled to or integrated with a bus input output (I/O) unit 402 that communicates address, data and command information with external systems via a system bus 403. System bus 403 may be of a type that can be exposed to external devices such as peripheral component interconnect (PCI) bus or universal serial bus (USB). More typically, system bus 403 is closed in that it couples only to devices integrated with or having special purpose interfaces to bus 403. A system, also called a "host bus", is a common feature on many commercial microprocessors and microcontrollers. Bus controller 404, which may be integrated within bus interface 402 or provided separately as shown in FIG. 4, arbitrates access to system bus 403 amongst the devices competing for access.

Bus controller 404 may also act as an interface to system memory 406. Alternatively, system memory 406 may be coupled directly to system bus 403, or implemented within microprocessor core 401. System memory 406 comprises, for example, random access memory (RAM), read only memory (ROM), programmable memory, and the like of any size desirable to meet the needs of particular applications.

Bus 403 also couples to external input/output devices through an I/O interface 407. I/O interface 407 supports communication with a number of external device and bus protocols such as USB, RS232, PCI, small computer systems interface (SCSI), IEEE1394 ("firewire") and the like as well as proprietary ports or bus protocols such as those found in hand-held and tablet computers. Functionally, interface 407 supports connections to pointing devices 408 (e.g., mouse, tablet, joystick and the like), serial I/O 409 (e.g., RS232 and USB), and network I/O 411 (e.g., Ethernet, USB, fibre channel and the like).

Graphic displays are implemented through display controller 412 that couples to receive data and commands from system bus 403 and drive display 414. Display controller 412 uses a frame buffer 413 to store and retrieve color information on a pixel-by-pixel basis that is updated several times per second. Frame buffer 414 may be implemented in separate memory associated with the display controller, or in system memory, or as a separate memory unit 414 as shown in FIG. 4.

In the case of a color display 414, frame buffer 413 may comprise 32 bits of data for each pixel, although 16-bit and 24-bit color data options remain available. In a 32-bit example, one byte is allocated to each of the red-green-blue colors, and the remaining eight bits are either not used, or used for an alpha channel that carries transparency information. Typical display screens 414 cannot resolve the full color spectrum possible with 32-bit/pixel data, nor can the human eye discern this number of distinctions. In fact, many would argue that anything more than 16-bit color depth is not needed in most applications. Nevertheless, 32-bit color data remains popular because it is conveniently handled by commercial memory devices with 32-bit interfaces and 32-bit wide data busses.

To be clear, the present invention is in no way confined to a particular hardware implementation, and FIG. 4 is provided primarily to aide in understanding of how hardware interacts with the systems and methods of the present invention. In preferred implementations, the present invention is implemented largely in Java programming constructs that execute on a virtual machine. In such cases, the virtual machine interacts with the hardware and operating system in a manner that hides most of the hardware-specific and operating system specific details from the software that implements the present invention.

An important feature of the present invention is that this "extra" or otherwise unused memory in the frame buffer 413 is leveraged to provide space for storing object identification information. Eight bits can easily be "stolen" from the color data space in a 32-bit system to allow for up to 256 unique object IDs to be stored without impacting the number of bits allocated to red green and blue information. In a particular example, only 7 bits are actually used for a total of 128 unique object IDs. In machines with 24-bit color depth, some of the bits used for object identification will reduce the RGB color depth, but will not affect visual display performance for most users and applications. Reducing color depth below 16 bits is also possible, however, some reduction in display appearance may occur in some applications.

Alternatively, the present invention contemplates explicitly increasing the size of the frame buffer 413 to hold the object identification information in accordance with the present invention. For example, a machine having a 16-bit or 24-bit color depth can be extended to have 32-bits of memory for each pixel in the frame buffer 413 at minimal cost due to the commercial popularity of 32-bit memory architectures. In these cases, a portion of the frame buffer 413 is explicitly or architecturally allocated to use by the present invention for object ID storage and retrieval.

In operation, a graphical user interface comprises a plurality of graphical display objects created by operating system or application software executing in microprocessor core 401. These objects are sent to display controller 412, which renders the objects by determining a z-axis order of the objects to identify objects with visible surfaces. A two-dimensional bit map is computed and stored in frame buffer 413 and each screen refresh cycle the frame buffer contents are driven out to the actual display device 414.

It should be noted that while the present invention does not require additional frame buffer memory for z-buffering, it remains compatible with such systems. Even where z-buffering is provided the present invention can improve the efficiency of many operations by providing efficient identification of objects and metadata associated with objects. Similarly, many three-dimensional graphics systems provide multiple layers of frame buffers to hold the frame currently being displayed as well as one or more working frames that are being prepared for imminent display. The present invention does not require, but can work with such systems.

Figure 5:
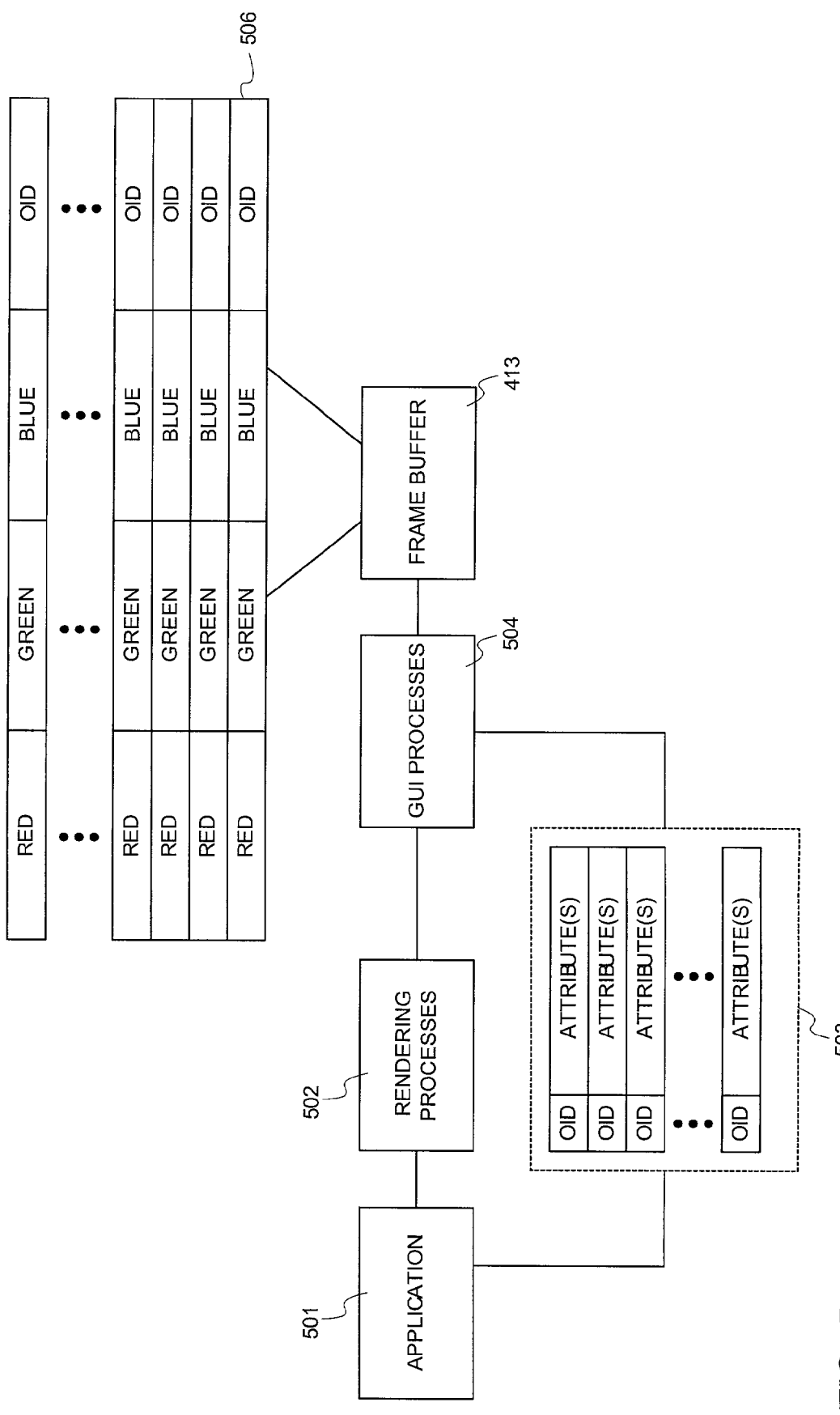
FIG. 5 illustrates exemplary processes in an implementation of the present invention in block diagram form.

FIG. 5 illustrates exemplary processes in an implementation of the present invention in block diagram form. A plurality of graphical display objects are created by application software 501 executing in microprocessor core 401 (shown in FIG. 4). Application 501 communicates with a data structure 503 that holds metadata about the objects. The selection of what metadata is held is entirely application dependent and may comprise text information naming the object, object dimensions, hyperlinks to documents or images related to the object, and a virtually unlimited variety of other metadata. Data structure 503 comprises a database, table, cache, or other hardware/software data structure having a plurality of entries. The entries are indexed by the object ID and contain attributes (i.e., metadata) of the associated object.

These objects are sent to rendering processes 502 that function to render an image of the objects. A two-dimensional bit map is computed and sent to operating system GUI processes 504 that handle the processes of communicating with frame buffer 413 and drawing the rendered image onto a display screen. Preferably, the task of encoding the object ID values into the color information is handled in the rendering processes 502 such that the GUI processes 504 require little or no modification. Frame buffer 413 includes a plurality of entries 506 where each entry is associated with a particular pixel, coordinate, or location on the screen of a display device. As illustrated in FIG. 5, entries 506 differ from conventional frame buffer data by including object ID fields (OID) in addition to the color information.

Optionally and preferably, GUI processes 504 can also access data structure 503 to retrieve attributes information for specified objects. GUI processes 504 are typically enabled either inherently or through direction of application processes 501 to read frame buffer data including the color information, from specified x-y locations. Because the frame buffer data includes object ID information, GUI processes 504 or application 502 can use an object ID to index into data structure 503 and retrieve stored attribute information. In essence, any type of attribute information stored can be readily retrieved knowing only the x-y position of a particular pixel and the color (object ID) value stored at that location.

GUI processes also receive external inputs from pointing devices and the like and use these inputs to draw and move cursors and/or pointers or the like on the display screen. In this manner, a user is enabled to visually select an x-y location or coordinate on the display screen and cause GUI processes 504 to readily retrieve the object ID information and, if desired, attribute information associated with the object ID without any complex or resource intensive computations.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. In particular, it should be clear that although the examples describe displaying a plurality of graphical objects that overlap, the system and method in accordance works in substantially the same manner when displaying and selecting a single object and in situations where the objects do not overlap. Depending on a viewpoint, sometimes objects will appear next to each other, and at other times appear in front of and behind each other. In either case, the present invention allows ready object selection using the object ID information in the frame buffer.

We claim:

1. A graphical user interface comprising:
 a rendered image of at least one graphical object, wherein the graphical object uses a number of pixels on a display device;
 a color value stored for each pixel in the display device; and
 object identification data stored with each pixel covered by the rendered image, wherein the object identification data uniquely identifies the graphical object located at the pixel.

2. The graphical user interface of claim 1, wherein the rendered image comprises a three-dimensional image comprising at least two graphical objects that are co-located at at least one point in an x-y view plane, wherein only one of the co-located graphical objects is visible at a pixel corresponding to the at least one point and the object identification data for the pixel identifies the visible graphical object.

3. The graphical user interface of claim 1 further comprising processes for writing the object identification data with the color value to a frame buffer when drawing the rendered image of the at least one graphical object on the display device.

4. The graphical user interface of claim 1 further comprising processes for reading the object identification data with the color value from a frame buffer.

5. The graphical user interface of claim 1 further comprising a cursor pointing to a particular coordinate of the graphical display device, movement of which is controlled by user input.

6. The graphical user interface of claim 5 further comprising processes for reading the object identification data, with the color value from the frame buffer of a pixel associated with the particular coordinate pointed to by the cursor.

7. The graphical user interface of claim 6 further comprising an interface for exporting the object identification information to an external process.

8. The graphical user interface of claim 6 further comprising a metadata information display object displayed on the display in response to the object identification data of the pixel associated with the particular coordinate pointed to by the cursor.

9. The graphical user interface of claim 6 further comprising an object-identification value indexed data structure holding metadata about the an object uniquely identified by the object identification value.

10. The graphical user interface of claim 4 further comprising processes for reading the object identification data with the color value from a frame buffer.

11. A graphical user interface comprising:
 a rendered image of at least one three-dimensional graphical object, wherein the graphical object uses a number of pixels on a display device, and wherein there is stored a respective color value for each pixel in the display device; and
 object identification data stored with each pixel covered by the rendered image, wherein the object identification data uniquely identifies the graphical object located at the pixel.

* * * * *